(No Model.)
S. W. SHOREY.
FASTENING FOR GLOVES AND OTHER ARTICLES.
No. 352,271. Patented Nov. 9, 1886.
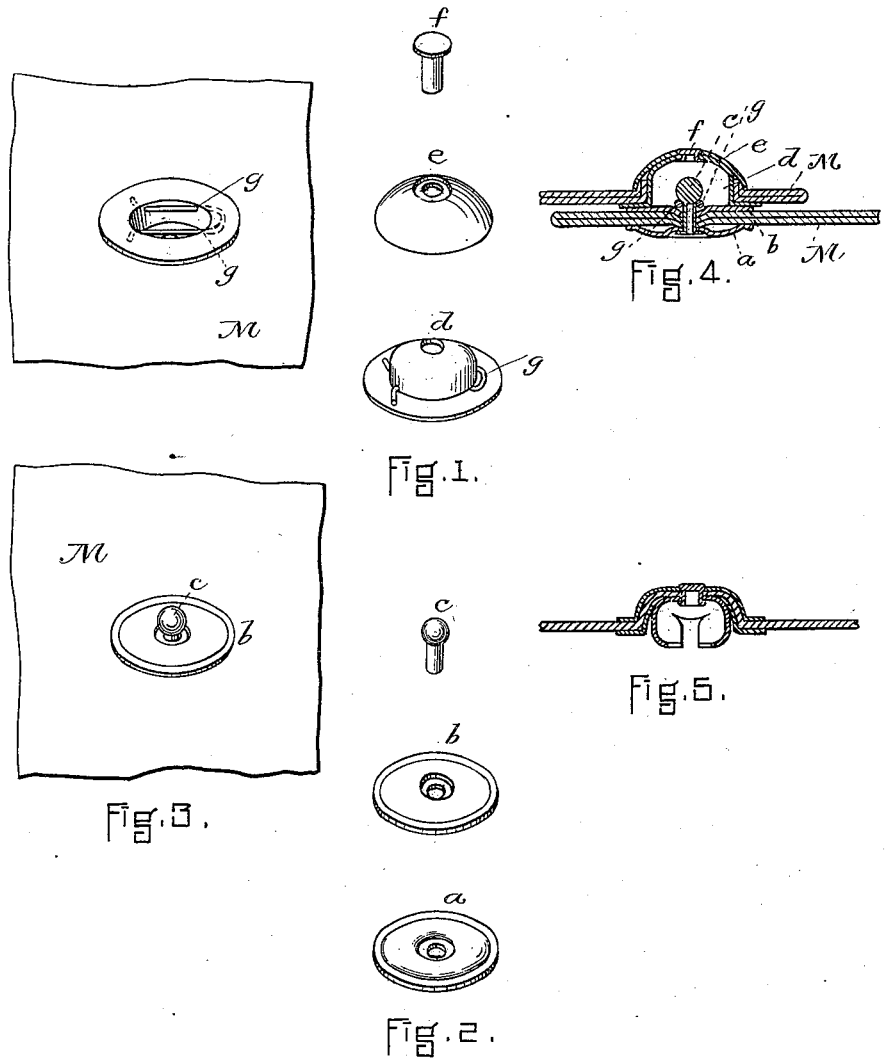

UNITED STATES PATENT OFFICE.

SAMUEL W. SHOREY, OF BOSTON, MASSACHUSETTS.

FASTENING FOR GLOVES AND OTHER ARTICLES.

SPECIFICATION forming part of Letters Patent No. 352,271, dated November 9, 1886.

Application filed August 16, 1886. Serial No. 210,979. (No model.)

*To all whom it may concern:*

Be it known that I, SAMUEL W. SHOREY, of Boston, in the county of Suffolk and State of Massachusetts, a citizen of the United States, have invented a new and useful Improvement in Fastenings for Gloves and other Articles, of which the following is a full, clear, and exact description, reference being had to the accompanying drawings, forming a part of this specification, in explaining its nature.

This invention is an improvement on the construction shown and described in Letters Patent No. 345,930, dated July 20, 1886, and it is to be used in connection with the same ball-button with which the contrivances of said former patent were intended to operate; and it consists in an organization whereby one of the parts described in the said former patent is entirely omitted and another and simpler part substituted therefor.

In the drawings, Figure 1 represents the different parts of the socket member of the fastening. Fig. 2 represents the different parts of the ball member of the fastening. Fig. 3 represents in the lower division the ball member of the fastening in position upon a piece of the material which is intended to be united, and in the upper division the lower side of the socket member of the fastening. Fig. 4 is a section of the two members of the fastening assembled and fixed to the material and engaged one member with the other, while Fig. 5 is a similar section of the socket member of the fastening patented as hereinbefore stated.

$a$ is the lower washer of the ball member of the fastener. $b$ is the upper washer of the ball member of the fastener, and $c$ is the ball and its shank, the two washers being placed opposite each other, with the material, M, to which they are to be fixed between them. The shank of the ball $c$ is passed through holes in the two washers and the hole in the intermediate material and upset upon the lower side, forming a very firmly attached ball-button. This contrivance forms no part of the present invention, but is described in order that the improvement in the socket member may be more readily understood.

The socket member consists of the washer $d$, the cap $e$, and the rivet $f$. In lieu of the separate rivet $f$, a riveting-flange may be made on the inside of the hole in the cap $e$, which can be upset on the inside of the central hole of the washer $d$. Across the interior of the washer are passed two wires, $g$, rather less distance apart than the diameter of the ball, so as to engage with the sides of the ball below its equator. These wires I prefer to make as a single return-bend, and to turn back the free ends against the sides of the washer, as shown in Fig. 1. The diameter of the hollow of the washer, as shown in Fig. 4, is about three times the diameter of the ball. This is a convenient size to give sufficient spring to the wires $g$, and is also convenient to allow a little play to the ball one way and the other. It is not, however, of absolute necessity that this width and proportion should be observed.

The sides of the dish in the washer should be somewhat more upright than in the washer described and shown in the patent referred to, and the hole in its center should be considerably smaller than it was shown in said patent, because the rivet at the center of the cap $e$ is to be upset over the edges of this hole in the washer, instead of over the edges of a hole in the cup or socket of the former patent.

It will be seen that instead of a piece of sheet metal, which is difficult and expensive to form, as the clasp for the ball in the socket member of the fastening, a very simple and cheap arrangement for clasping the sides of the ball is here provided; and, in addition to that, the cap may be made somewhat flatter, and the entire height of the fastening and material to which it is attached from the bottom of the lower washer of the ball member to the top of the cap of the socket member somewhat less than the contrivance of the former patent.

It is obvious that in the application of this device the cap $e$ may be reduced in size, so as to form simply a rivet-flange, which shall clamp the material to be fastened between its lower side and the top of the washer; and it is also obvious that it may be ornamented in various ways, and that it may be made of a great variety of material. Probably, however, the most convenient thing for the practical manufacture of these articles is sheet metal, although celluloid and hard-rubber caps would have advantages. It is also obvious that instead of riveting the parts together, as described, they may be screwed.

I claim as my invention and desire to secure by Letters Patent of the United States—

1. The improvement in fastenings for gloves and other articles, comprising the cap $e$, the washer $d$, adapted to be riveted together, as described, said washer having combined therewith the parallel wires $g$, passing through the upright sides near the rim thereof, substantially as described.

2. The combination, with the washer of the socket member of a ball-and-socket fastening and the parallel wires $g$, of the ball member of the fastening, substantially as described.

3. As a member of a ball-and-socket fastening for garments, &c., a cap-washer, $d$, perforated for riveting to another member to be located on the opposite side of the material, which cap-washer is traversed by two parallel wires, $g$, attached thereto, substantially as and for the purposes described.

SAMUEL W. SHOREY.

Witnesses:
F. F. RAYMOND, 2d,
FRED. B. DOLAN.